(No Model.)
W. C. CARTER.
HAND OPERATED SWINGING GATE.
No. 405,302. Patented June 18, 1889.
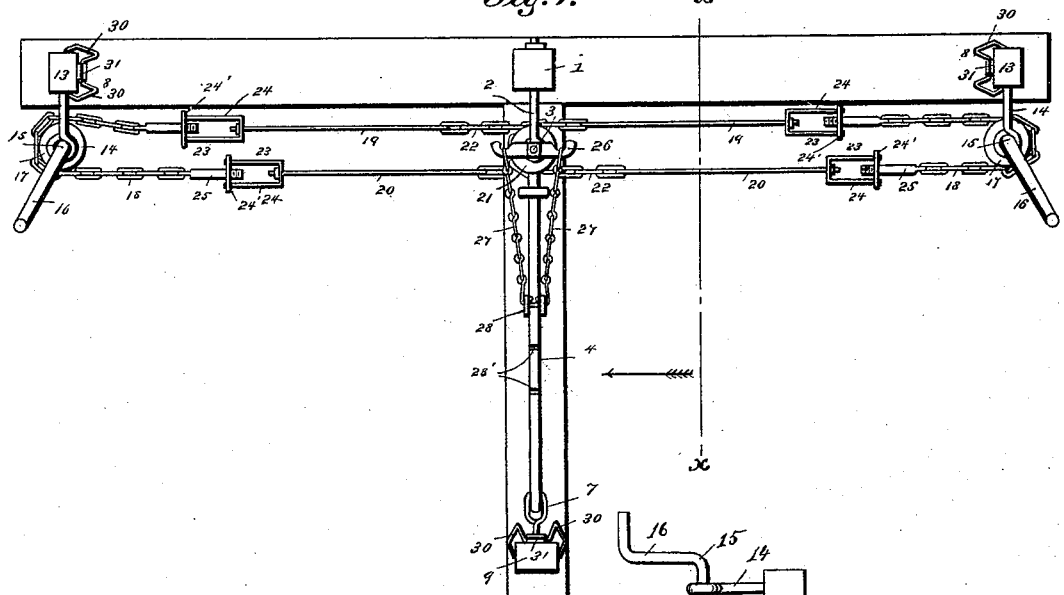
Fig. 1.
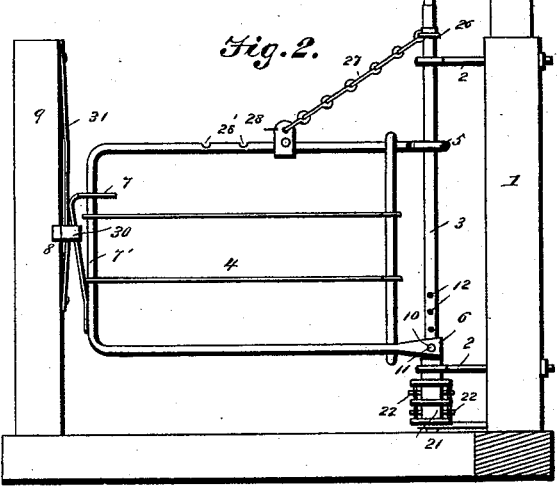
Fig. 3.
Fig. 2.
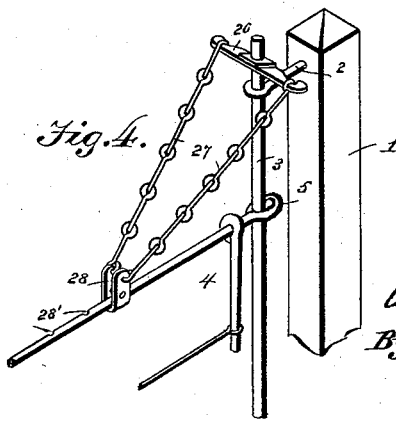
Fig. 4.
Witnesses
Inventor:
Wesley C. Carter
By, Edson Bros,
Attorneys.
N. PETERS, Photo-Lithographer, Washington, D. C.

UNITED STATES PATENT OFFICE.

WESLEY C. CARTER, OF GALVA, ILLINOIS, ASSIGNOR OF ONE-HALF TO THOMAS W. PATTERSON, OF SAME PLACE.

HAND-OPERATED SWINGING GATE.

SPECIFICATION forming part of Letters Patent No. 405,302, dated June 18, 1889.

Application filed February 19, 1889. Serial No. 300,473. (No model.)

*To all whom it may concern:*

Be it known that I, WESLEY C. CARTER, a citizen of the United States, residing at Galva, in the county of Henry and State of Illinois, have invented certain new and useful Improvements in Hand-Operated Swinging Gates; and I do hereby declare the following to be a full, clear, and exact description of the invention, such as will enable others skilled in the art to which it appertains to make and use the same.

My invention relates to hand-operated swinging gates; and it has for its object to provide a gate which is capable of being unlatched and opened without any loss of power and motion between the operating crank-shaft and the gate pivot-shaft, which can be readily adjusted at a suitable elevation above the surface of the ground to permit animals to pass beneath the same and to separate animals of different sizes, and at the same time is capable of being opened or closed from either side; to provide means for expeditiously taking up the slack in the operating chain-connections, and, finally, to improve the parts in minor details with a view of simplifying and cheapening the construction thereof and making the same more durable and efficient.

With these ends in view my invention consists of the peculiar construction and arrangement of parts, as will be hereinafter fully described, and particularly pointed out in the claims.

In the accompanying drawings, Figure 1 is a plan view of my improved gate. Fig. 2 is a side elevation thereof, and Figs. 3 and 4 are detail views of parts of my improvements.

Referring to the drawings, in which like numerals of reference denote corresponding parts in all the figures, 1 designates the hinge-post or upright, to which are secured horizontal arms or bearings 2, in which is journaled a vertical pivot-shaft 3, on which a gate 4 is hung. This gate is of any preferred or of the ordinary construction, and it is carried by hinge-loops 5 6, which are rigidly secured thereto, and which are capable of a slight vertical rocking play or movement on the vertical pivot-shaft 3, for the purpose of allowing the gate to be tilted bodily in a vertical plane, thus withdrawing the latch 7 thereof from the keeper 8 on the latch-post 9, which post is erected immediately opposite to and at a suitable distance from the hinge-post 1. The hinge-loops 5 6 are slightly elongated for the purpose of permitting the gate to tilt slightly, and the lower loop 6 is provided with a transverse aperture or slot 10, through which is passed a key or pin 11 for the purpose of holding the gate at any suitable elevation above the surface of the ground, said key or pin being fitted in one of the series of transverse apertures 12 formed in the pivot-shaft 3, by which the gate is carried. By making the pivot-shaft 3 straight with apertures therein, and using the hinge-loops 5 6, the gate can be adjusted vertically on the pivot-shaft 3, and at the same time can swing or turn with the shaft, whether it is raised or lowered, and when it is raised small animals—such as hogs—are permitted to pass beneath the gate without opening the latter, and animals of different sizes can be separated, while at the same time the gate can be opened from either side without the necessity of lowering it to its normal position, and is thus enabled to swing over snow, and can be hung on a hillside without inconvenience.

At suitable distances on opposite sides of the hinged posts I erect uprights or posts 13, each of which has two vertically-aligned bearings 14, in which are journaled vertical crank-shafts 15. The upper end of each crank-shaft 15 has a suitable handle 16 within convenient reach of a person on horseback or in a vehicle, while at the lower end of each crank-shaft is a horizontal grooved pulley 17, around which passes a chain, rope, or other suitable flexible connection 18, to the ends of which are connected, by devices which I will presently describe, horizontal connecting-rods 19 20.

To the lower end of the vertical pivot-shaft 3, which carries the swinging gate, are secured two pulleys (or one double pulley) 21, to each of which is connected one of the vertical crank-shafts 15. Around each pulley 21 passes a short section of chain or rope 22, to the ends of which are connected the connecting-rods 19 20, and in order to prevent the short sections of chain or rope 18 and 22 from slipping around the pulleys 17 and 21 when either one or other of the vertical crank-shafts 15 is operated, and thus prevent any loss of power or motion, I connect said chains or ropes to their respective pulleys by means of pins or bolts which pass through the chains and are secured in the pulleys.

In order to keep the connecting-rods 19 20 and chains 18 and 22 under the proper tension, and to take up any slack therein, I have provided a swivel-connection 23 between each rod 19 or 20, and the chain 18, said swivel-connection consisting of an elongated eye 24, which is pivotally connected to one end of the rod and has a threaded cross-head 24, in which works a bolt 25, connected at one end to the chain 18. It is obvious that the eye 24 can be turned or rotated to take up the slack in the chains 18 22 and maintain said chains and the connecting-rod between the same under the proper tension.

It will be understood that, as I have provided a vertical crank-shaft on each side of the gate and connected each shaft with the vertical pivot-shaft by the intermediate connections hereinbefore described, the gate can be opened from either side, and it can be hung at either side of the road, as is most convenient.

To the upper end of the vertical pivot-shaft 3 is fixed a horizontal arm 26, to the ends of which are connected chains or ropes 27, which extend and are connected at a common point to an adjustable clamp 28, which is secured to the upper bar or panel of the gate 4, which ropes or chains materially relieve the hinge-loops of the weight of the gate and thereby aid in strengthening the gate. This clamp is made of a strap or plate which is bent around the upper bar or panel of the gate, and through the meeting ends of the clamp passes a bolt which fits in one of a series of notches or recesses 28 formed in the bar or panel of the gate, or in a plate which is to be fixed to the gate. By moving or adjusting the clamp on the gate, bar, or panel either toward or from the vertical pivot-shaft the tension of the chains or connections 27 can be increased, and thus maintain the connections under the proper tension, and as the securing-bolt fits in the notches or recesses 28 it is evident that the clamp is very securely held in place. When the vertical pivot-shaft is first turned by the crank-shaft, one of the chains or connections 27 between the cross-head on said shaft and the gate is drawn upon and tilts the gate slightly in a vertical plane before it begins to move laterally. This frees the latch carried by the gate from engagement with the keeper, and the continued rotation of the crank and pivot shafts causes the gate to swing in either direction with the pivot-shaft by which it is carried.

The latch 7 preferably consists of a metallic spring-plate, which is arranged in an inclined position on and secured at its lower end to the vertical stile 7' of the gate, and the upper end of this latch has an elongated eye which fits around said stile of the gate to prevent lateral displacement of the latch.

The latch-post 9 and each upright 13 has a keeper 8, which is adjustable vertically on the post in order that the latch may properly engage therewith when the gate is in an elevated position. This keeper is made of a plate of spring metal, which is bent at its middle to form a loop 29, and to provide the two wings 30, which are inclined, as shown, to adapt the keeper to yield or give to the latch when the gate is opened or closed, the latch being confined between said wings. In the loop 29 is fitted a vertical guide 31, which confines the keeper at any desired elevation between itself and the post by frictional contact between the engaging faces, as is obvious.

The operation of my invention will be readily understood from the foregoing description, taken in connection with the drawings.

I am aware that slight changes in the form and proportion of parts can be made without departing from the spirit or sacrificing the advantages of my invention.

Having thus fully described my invention, what I claim as new, and desire to secure by Letters Patent, is—

1. In a gate, the combination of a vertical pivot-shaft having the pulleys at its lower end and a rigid cross-head at its upper end, a gate provided with the elongated hinge-loops, which fit loosely on said vertical pivot-shaft to adapt the gate to have a limited tilting movement and to swing or turn with said shaft, connections 27, intermediate of said gate and opposite ends of said cross-head, the vertical crank-shafts, each having a pulley, a chain passing around and connected to each pulley of the crank and pivot shafts, the connecting-rods, and a swivel connected to the rods and chains, all arranged and combined for service, substantially as herein shown and described.

2. The combination of a vertical pivot-shaft carrying a gate which is capable of a limited tilting movement, a cross-head fixed to said shaft, an adjustable sleeve fixed on one of the bars of said gate, and connections between said adjustable sleeve and the cross-head, substantially as described.

In testimony whereof I affix my signature in presence of two witnesses.

WESLEY C. CARTER.

Witnesses:
T. W. PATTERSON,
WM. WILLIS.